US012682252B2

(12) United States Patent
Evans et al.

(10) Patent No.: US 12,682,252 B2
(45) Date of Patent: Jul. 14, 2026

(54) MACHINE LEARNING MODEL MANAGEMENT AND SOFTWARE DEVELOPMENT INTEGRATION

(71) Applicant: Microsoft Technology Licensing, LLC, Redmond, WA (US)

(72) Inventors: Patrick W. J. Evans, Fall City, WA (US); Debadeepta Dey, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/738,110

(22) Filed: May 6, 2022

(65) Prior Publication Data

US 2023/0359458 A1 Nov. 9, 2023

(51) Int. Cl.
G06F 8/34 (2018.01)
G06F 8/35 (2018.01)
(Continued)

(52) U.S. Cl.
CPC ................ G06N 3/10 (2013.01); G06F 8/35 (2013.01); G06F 8/36 (2013.01); G06F 8/71 (2013.01);
(Continued)

(58) Field of Classification Search
CPC .......... G06F 8/35; G06F 11/3684; G06F 8/71; G06F 8/36; G06F 9/547; G06F 21/105;
(Continued)

(56) References Cited

U.S. PATENT DOCUMENTS

| | | | |
|---|---|---|---|
| 10,747,651 B1 * | 8/2020 | Vanderwall | ......... G06F 11/3684 |
| 2019/0286424 A1 | 9/2019 | Brown et al. | |

(Continued)

FOREIGN PATENT DOCUMENTS

| | | |
|---|---|---|
| CN | 111459610 A | 7/2020 |
| WO | 2020242809 A1 | 12/2020 |

OTHER PUBLICATIONS

Huang et al, CN 101546290, (translation), Sep. 30, 2009, 9 pgs < CN_101546290.pdf>.*

(Continued)

*Primary Examiner* — Tuan A Vu

(57) ABSTRACT

In examples, a declaration of an ML model is identified within source code of a software project. As a result, a model wrapper may be generated for the ML model and used when compiling and/or executing the software code. Further, a representative object may be generated to enable management of the ML model during the software development process. As an example, model attributes associated with the ML model may be identified from the software code and used to manage the ML model accordingly. In examples, a runtime library associated with the ML model may be automatically included in the software project and/or training of the ML model may be automatically initiated. In some instances, a placeholder ML model or a partially trained or intermediate ML model may be used when building and executing the software project while the ML model is still being trained, thereby enabling continued software development.

20 Claims, 9 Drawing Sheets

(51) Int. Cl.

| | |
|---|---|
| *G06F 8/36* | (2018.01) |
| *G06F 8/71* | (2018.01) |
| *G06F 9/54* | (2006.01) |
| *G06F 11/3668* | (2025.01) |
| *G06N 3/10* | (2006.01) |
| *G06N 20/00* | (2019.01) |
| *G06N 3/044* | (2023.01) |
| *G06N 3/0464* | (2023.01) |

(52) U.S. Cl.
CPC .......... *G06F 9/547* (2013.01); *G06F 11/3684* (2013.01); *G06N 20/00* (2019.01); *G06N 3/044* (2023.01); *G06N 3/0464* (2023.01)

(58) Field of Classification Search
CPC ...... G06N 20/00; G06N 3/044; G06N 3/0464; G06N 3/10
See application file for complete search history.

(56) References Cited

U.S. PATENT DOCUMENTS

| | | | |
|---|---|---|---|
| 2020/0184037 A1* | 6/2020 | Zatloukal | ............. G06F 21/105 |
| 2020/0184376 A1* | 6/2020 | Parameswaran | ....... G06N 20/00 |
| 2020/0380415 A1* | 12/2020 | Siracusa | ................... G06F 8/35 |
| 2021/0334663 A1* | 10/2021 | Shen | ................... G06N 3/0464 |
| 2021/0398015 A1 | 12/2021 | Fogal et al. | |
| 2021/0406774 A1 | 12/2021 | Browne et al. | |
| 2023/0120516 A1* | 4/2023 | Weber | ................... G06N 3/044 |
| | | | 706/26 |

OTHER PUBLICATIONS

Brown et al, CN 110709816, (translation) Jan. 17, 2020, 20 pgs < CN_110709816.pdf>.*

Dai et al, CN 108008942, (translation), May 8, 2018, 17 pgs <CN_108008942.pdf>.*

MSFT, "Wrapper Specifications: How to infer classification or regression model type", Retrieved from: https://github.com/microsoft/ml-wrappers/blob/ef53e6db0c93623abd8e88a70984d2e97cecc5f8/docs/WrapperSpecifications.md, Dec. 29, 2021, 2 Pages.

"International Search Report and Written Opinion Issued in PCT Application No. PCT/US2023/013563", Mailed Date: May 25, 2023, 17 Pages.

Communication pursuant to Article 94(3) Received in European Patent Application No. 23712974.7, mailed on Nov. 17, 2025, 07 pages.

* cited by examiner

500

508

510

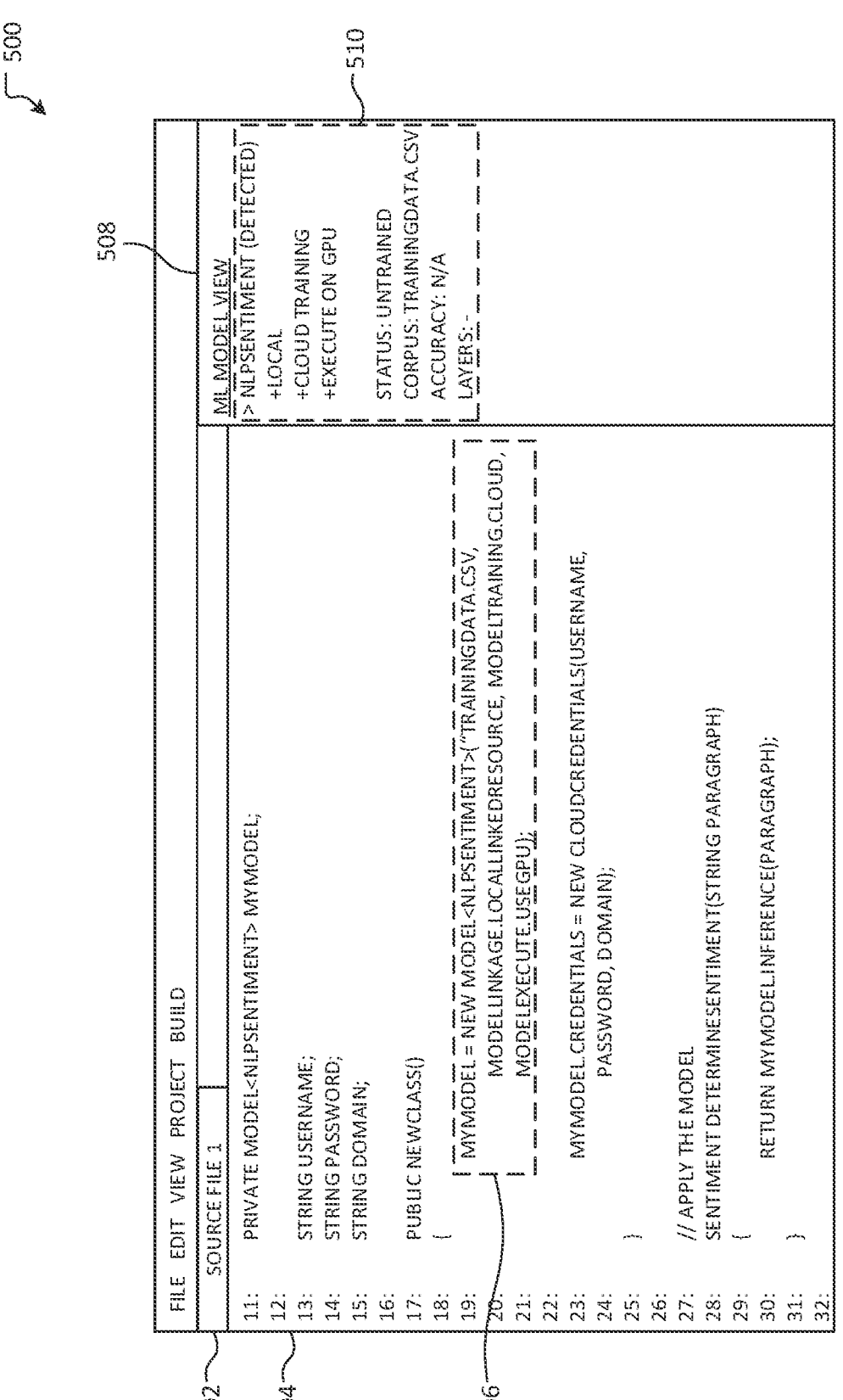

```
FILE  EDIT  VIEW  PROJECT  BUILD

SOURCE FILE 1

11:    PRIVATE MODEL<NLPSENTIMENT> MYMODEL;
12:
13:    STRING USERNAME;
14:    STRING PASSWORD;
15:    STRING DOMAIN;
16:
17:    PUBLIC NEWCLASS()
18:    {
19:        MYMODEL = NEW MODEL<NLPSENTIMENT>("TRAININGDATA.CSV,
20:            MODELLINKAGE.LOCALLINKEDRESOURCE, MODELTRAINING.CLOUD,
21:            MODELEXECUTE.USEGPU);
22:
23:        MYMODEL.CREDENTIALS = NEW CLOUDCREDENTIALS(USERNAME,
24:            PASSWORD, DOMAIN);
25:    }
26:
27:    // APPLY THE MODEL
28:    SENTIMENT DETERMINESENTIMENT(STRING PARAGRAPH)
29:    {
30:        RETURN MYMODEL.INFERENCE(PARAGRAPH);
31:    }
32:
```

502

504

506

ML MODEL VIEW
> NLPSENTIMENT (DETECTED)
   +LOCAL
   +CLOUD TRAINING
   +EXECUTE ON GPU

STATUS: UNTRAINED
CORPUS: TRAININGDATA.CSV
ACCURACY: N/A
LAYERS: -

FIG. 5

MACHINE LEARNING MODEL MANAGEMENT AND SOFTWARE DEVELOPMENT INTEGRATION

BACKGROUND

Software may rely on or otherwise utilize a machine learning model for various functionality. However, managing the machine learning model during software development may be difficult or tedious, resulting in additional complexity, reduced flexibility, potentially unnecessary overhead, and decreased accessibility of machine learning technology.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to machine learning (ML) model management and software development integration. In examples, a declaration of an ML model is identified within source code of a software project. As a result, a model wrapper may be generated for the ML model and used when compiling and/or executing the software code. Further, a representative object may be generated to enable management of the ML model during the software development process. As an example, model attributes associated with the ML model may be identified from the software code and used to manage the ML model accordingly. In examples, a runtime library associated with the ML model may be automatically included in the software project and/or training of the ML model may be automatically initiated. In some instances, a placeholder ML model or a partially trained or intermediate ML model may be used when executing the software project while the ML model is still being trained, thereby enabling continued software development.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates an overview of an example graphical user interface for a development application according to aspects described herein.

DETAILED DESCRIPTION

Figure 1:
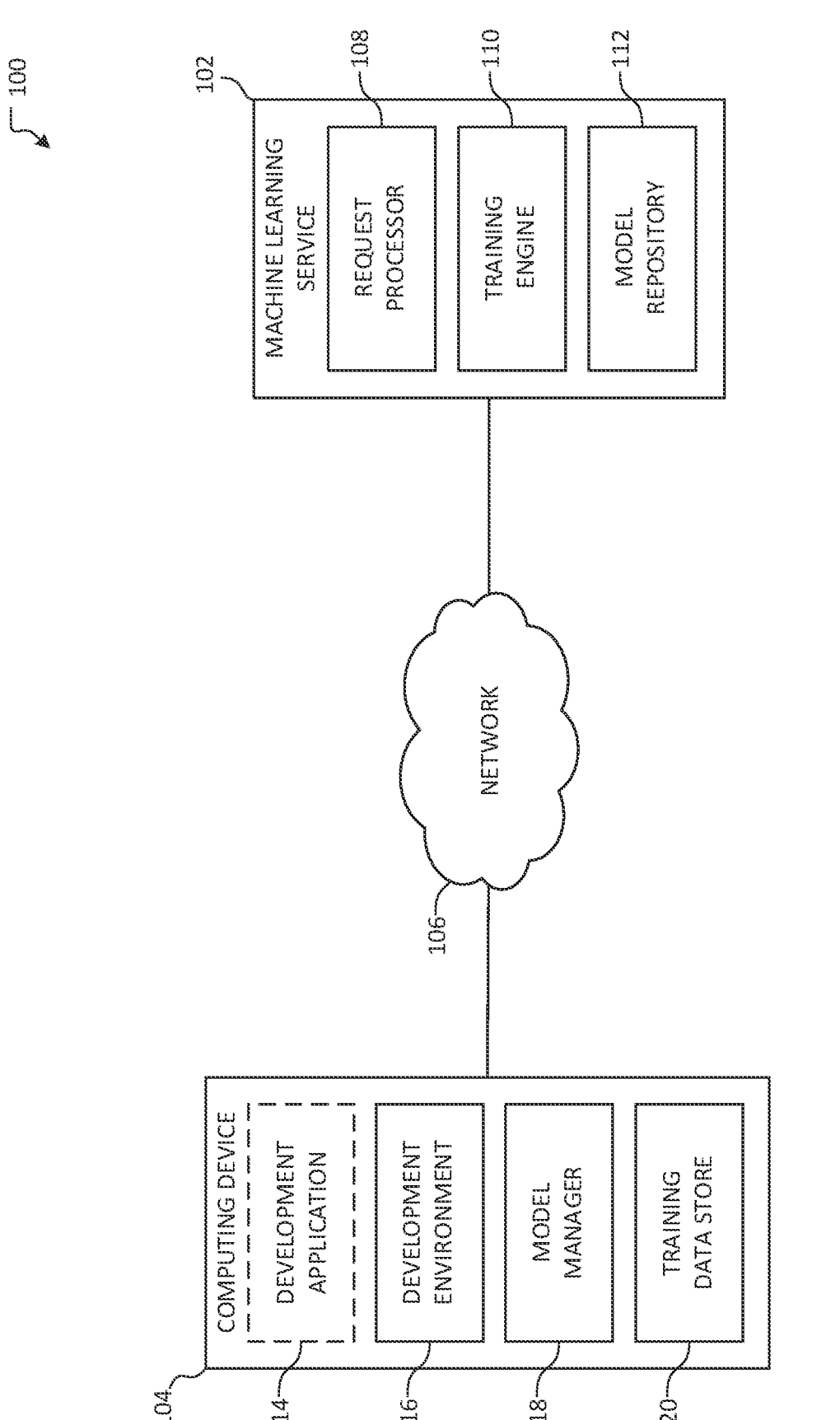
FIG. 1 illustrates an overview of an example system in which aspects of machine learning model software development integration may be used according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, one or more machine learning (ML) models are used to provide a variety of software functionality. For example, an ML model may be a purpose-built model, may be a pre-built, existing, or otherwise generic model, or may be a tuned model based on an existing model, among other examples. The ML model may be used as part of a local framework or may be hosted in a remote or cloud-based framework. However, such frameworks may have platform-specific challenges (e.g., relating to model execution, training, and lifecycle management), which may be configured, scripted, and/or otherwise managed by a user who is using the ML model as part of the software development process. ML models may comprise a variety of architectures and formats, including, but not limited to, traditional neural networks, deep learning models, convolutional neural network (CNN) models, bidirectional long short-term memory (BiLSTM) models, and the like. Further, existing canonical pre-built models found in model zoos and similar online resources may be advantageous for use in an application.

As an example, an ML model may be hosted as part of a remote framework and shared to an application (or run as a separate process, as another example), such that the ML model may be used via a set of API calls. However, in such an example, the lifecycle of the ML model may be manually managed by the user. As another example, a framework may offer a set of abstraction interfaces for aspects of model management (e.g., relating to the training and/or inference processes during software development). However, this may still result in a difficult coding experience and/or poor or complex model management when attempting to use an ML model in a software application. Additionally, changes associated with the ML model may result in additional manual involvement by the user, which may be duplicative, tedious, and introduce additional potential for human error. For some examples, when more training data is introduced during development, or a model must be retrained from scratch with a new corpus. Such issues may be further exacerbated when different users are involved in the software development process (e.g., where a first user or team manages ML model integration aspects and a second user or team manages more general software development). Thus, in these and other examples, it will be appreciated that ML models may not be treated as "first-class objects" (e.g., with managed resource support) in any of a variety of languages and/or software development environments.

Accordingly, aspects of the present disclosure relate to ML model management and software development integration. In an example, the use of an ML model within software code may be identified, such that the lifecycle of the ML model may be automatically managed (e.g., to initiate training of the ML model, to update aspects of the ML model, to include a library associated with the ML model, and/or to link the ML model to the resulting executable). As a result of identifying use of the ML model, the ML model may be treated as a resource within the software development environment (e.g., such that it may automatically be managed accordingly), thereby reducing burdens that may otherwise be associated with using an ML model as part of the software development process.

As an example, an ML model declaration may be identified inside of a source code file associated with software. A declaration may be an explicit use of a model, an inferred use of a model, or the declaration of a reference or pointer to a model. A declaration may also be contextual in nature, including scenarios where a model requirement may be determinable from features such as code surround. The declaration may be identified by a compiler (e.g., during a make process) or by an integrated development environment (IDE), among other examples. For example, the source file may be part of a software project (e.g., including one or more software source files and/or resources) managed by the IDE. The ML model declaration may be identified as a result of the ML model declaration conforming to a predefined format (e.g., including a function or an API call, such as a generic model constructor or a decorated class) or using pattern matching techniques, among other examples. In other instances, a user may provide an indication associated with an ML model declaration, for example to confirm that an ML model declaration was detected correctly or to identify a subpart of software code that includes the ML model declaration. Thus, it will be appreciated that any of a variety of techniques may be used to automatically identify the use of an ML model. Further, any number of ML model declarations may be identified, such that each associated ML model may be managed according to aspects described herein.

A set of attributes may be determined for an identified ML model, including, but not limited to, one or more model parameters, an indication as to a training data source, a type inference, and/or a set of hyperparameters. As another example, a layer hyperparameter, an activation function, and/or other architectural features for the ML model may be programmatically defined (e.g., as may be specified via one or more lambda functions and/or code attributes in a source file). In some instances, it may be determined whether the ML model should be trained locally or using a remote training service and/or whether the ML model should be trained using a central processing unit (CPU) and/or graphics processing unit (GPU). Such attributes may be automatically determined based on the content of software code, based on a set of preferences (e.g., as may be pre-defined defaults by an IDE and/or specified by a user), or received as user input (e.g., in response to one or more prompts or via a user interface of an IDE), among other examples.

As a result of identifying an ML model declaration, a representative object may be generated in a build system to manage the ML model according to aspects described herein. The object may include attributes associated with the model. Additionally, a wrapper may be generated for the ML model. As used herein, the "wrapper" may encapsulate the ML model to simplify, abstract away, and/or restrict the interface between the software code and the ML model. The wrapper may define a structure for input and/or output for information to and from the ML model and/or have an associated type (e.g., as may be determined from the software code), thereby supporting type verification within the development environment and/or to provide user convenience when authoring associated software code. Additionally, a runtime environment and/or library associated with the ML model may be automatically included as a result of identifying the ML declaration.

As noted above, any of a variety of ML models may be used. For example, the ML model may be an ML model that has not yet been trained, may be an existing model (e.g., from another project or from a repository of pre-built ML models), or may be an existing model that will be tuned for a more specific context (e.g., using a task-specific training corpus). In instances where the declaration is for an ML model that does not need additional training, the wrapper may include a reference to the model, thereby enabling its use within the software code. In some examples, the ML model may be remote from the computing device on which the software executed, as may be the case when an API of an ML service is used. In such examples, the wrapper may utilize a set of API calls associated with the ML service, thereby enabling transparent and automatic use of the ML model associated with the ML service.

In instances where the ML model has not yet been trained or finetuned, the ML model may be instantiated based on an identified ML model declaration. For example, the ML model (and, in some instances, a set of associated hyperparameters) may be instantiated using one or more properties identified from the software code and/or according to a set of preferences, among other examples. For example, indications as to a training data source, a task for which the ML model will be used, whether the model should be trained locally or remotely (e.g., as may be indicated by a user-configurable default training hierarchy, for example indicating a hierarchy of local training and/or one or more cloud-based training services), and/or whether the model should be trained using CPU and/or GPU processing may be used to instantiate the ML model accordingly.

Training of the ML model may be automatically managed. For example, training may be automatically initialized locally or remotely. In some instances, the training may be automatically initialized based on identifying the declaration of the ML model or may be initialized in response to an indication received from a user, among other examples. The ML model may be trained according to a target error goal and/or using a provided loss function (e.g., as may be determined from a source file). As another example, an indication as to a target number of epochs may be provided, such that the ML model is trained until the target number of epochs has been reached. Such aspects may be automatically determined from the software code in some examples. An indication of model characteristics may be presented to the user during training, including model accuracy information, a current number of epochs, an associated training cost, and/or an estimated time of completion.

The ML model may be trained according to a set of constraints, which may be determined from software code, according to a set of defaults, and/or according to one or more user preferences. Example constraints include, but are not limited to, a model latency, memory performance, task accuracy, an amount of CPU, TPU, and/or GPU hours, a set of hardware with which to perform training (e.g., a generation, model, or type of GPU), and/or a maximum training cost. In examples where it is determined that training is unable to satisfy the set of constraints, one or more candidate models (e.g., that satisfy a subset of constraints and/or are closest to satisfying a constraint) may be presented for selection by a user or, as another example, a candidate model may be automatically selected.

In examples, a placeholder model may be generated and used while the ML model is trained. As a result, the associated software may be executed and tested using the placeholder model, thereby enabling continued software development even without a fully trained ML model. As another example, a partially trained or intermediate model may be used as an alternative to or subsequent to the placeholder model. In such an example, the intermediate model may be updated during training, such that the software is executed using an intermediate ML model having an improving or changing accuracy. In instances where the ML model is trained remotely, the intermediate or fully trained ML model may be obtained from the training service. In examples, the managed ML model may be obtained as a resource manifest and the ML model as an object (e.g., in Open Neural Network Exchange (ONNX) or other format).

In some instances, an ML model wrapper may be updated as a result of changes to associated software code and/or based on changes during ML model training, such that the wrapper represents attributes associated with the ML model (e.g., relating the type and/or structure for input and/or output for information to and from the ML model). As another example, an ML service may provide an indication that a different ML model may be better-suited, such that the suggestion may be presented to the user and, upon acceptance, the wrapper and/or associated software code may be updated accordingly. Additionally, an indication of changes to the software code may be provided to the ML service, thereby affecting the training of the ML model. In some instances, training may be restarted or resumed depending on the nature of the changes. For example, training of the ML model may be incrementally changed as a result of an incremental change to corresponding software code and/or training data.

As another example, an ML model may be finetuned or updated as a result of reinforcement learning during execution with runtime data that may not necessarily be used to update the training data with which the ML model is being trained (e.g., as may be configured by a user; in other examples such runtime data may be used to update the training data accordingly). As a further example, software may be distributed with a ML model that is trained and incorporated according to aspects described herein, while a finetuned ML model may be cached at a user's computing device and used in place of or in addition to the distributed ML model.

It will be appreciated that a development environment may include an integrated development environment (IDE) and/or may include a set of source files that are part of a build process (e.g., using a Makefile, Project file, or Solution), among other examples. Additionally, aspects of the present disclosure may be used in the context of interpreted languages and/or in a statically compiled context. "Building" (or alternatively "making" a project) performs the pre-compile, compile, link, custom, and/or output phases. For example, the build process may be performed according to build or project definitions, which may be "universal" and/or environment-specific, among other examples. The build process may be performed for each project specified by the build or project definitions, which may thus generate output, including a deployment package. For non-compiled languages (such as scripts), the build process may involve an abbreviated cycle of inspection and verification of interpreted code, and output of associated resources that may include updating a deployment package. As another example, a static type checker may be used (e.g., without interpreting the non-compiled language), such as Pyright. Partial builds or makes may be done in a development environment for debugging (e.g., using a debugger interface with which to evaluate the behavior of the software) and/or real-time edit purposes. Further, an ML model generated and/or trained according to aspects described herein may be exported (e.g., in an object format such as ONNX, via an IDE). As used herein, such a package may include one or more executables (e.g., as may have been generated according to aspects described herein) and a set of associated resources, including, but not limited to, an ML model object, a runtime library (e.g., as may be associated with the ML model object), and/or graphical resources, among other examples.

Thus, as a result of managing the lifecycle of an ML model according to aspects described herein, integration of the ML model with a software project may be simplified, thereby resulting in a streamlined software development process (e.g., having a reduced likelihood of human error and a lower associated skill level requirement). Additionally, development may be accelerated as a result of automatically initializing, training, and/or updating ML models associated with software code. Similarly, the described aspects may result in increased software portability, as model-specific idiosyncrasies may be handled by the development environment, thereby abstracting away differences and providing substantially consistent software interfaces with which to integrate ML models into software code.

FIG. 1 illustrates an overview of an example system 100 with which aspects of machine learning model software development integration may be used according to aspects described herein. As illustrated, system 100 includes machine learning (ML) service 102, computing device 104, and network 106. In examples, ML service 102 and computing device 104 communicate via network 106, which may comprise a local area network, a wireless network, or the Internet, or any combination thereof, among other examples.

Computing device 104 may be any of a variety of computing devices, including, but not limited to, a laptop computing device, a desktop computing device, a tablet computing device, or a mobile computing device, among other examples. As illustrated, computing device 104 includes development application 114, development environment 116, model manager 118, and training data store 120. Development application 114 may be an integrated development environment for editing software code, for example providing syntax highlighting, type checking, and/or code suggestions, among other examples. Development environment 116 may include a software development toolchain (e.g., including a compiler, linker, one or more libraries and/or resources, and/or a debugger, among other examples). Thus, development environment 116 may parse and/or compile software code (e.g., as may have been authored by development application 114), as may be the case for interpreted languages or statically compiled languages, respectively.

Development application 114 is illustrated using a dashed box to indicate that, in some examples, development application 114 may be omitted. For example, rather than using an IDE, software may be developed using a text editor and compiled via the command line. Thus, it will be appreciated that while examples are described in the context of an IDE or with respect to a Makefile-based build process, similar aspects may be applied in a variety of other contexts.

Computing device 104 further includes model manager 118, which manages a lifecycle associated with one or more ML models according to aspects described herein. In examples, model manager 118 may identify an ML model declaration within software code (e.g., as may be authored by development application 114 and/or compiled or interpreted within development environment 116). As a result of identifying the ML model declaration, model manager 118 may generate a representative object associated with the ML model declaration that includes a set of attributes that was determined for the ML model.

For example, model manager 118 may determine one or more model parameters, a training data source (e.g., as may be stored by training data store 120), and/or a set of hyperparameters. As an example, a layer hyperparameter, an activation function, and/or other architectural features for the ML model may be programmatically defined within software code (e.g., as may be specified via one or more lambda functions and/or code attributes in a source file). As another example, such attributes may be determined based on a set of defaults (e.g., as may be pre-defined by development application 114 and/or specified by a user) or may be received as user input (e.g., in response to one or more prompts or via a user interface of development application 114), among other examples.

As noted above, an ML model declaration identified by model manager 118 may be for an ML model that has not yet been trained, may specify an existing model (e.g., from another project or from a repository of pre-built ML models), or may specify an existing model to be tuned for a more specific context (e.g., using a task-specific training corpus, as may be stored by training data store 120). Accordingly, model manager 118 may initialize a new ML model or may obtain an existing ML model (e.g., from model repository 112) depending on the identified ML model declaration. In some instances, model manager 118 may include one or more libraries associated with the ML model declaration.

Similarly, model manager 118 may initiate training of the ML model. For example, model manager 118 may determine whether the ML model should be trained locally or using a remote training service and/or whether the ML model should be trained using a CPU and/or GPU. Model manager 118 may make such determinations based on associated software code, a user preference, and/or a default configuration, among other examples. Model management may default to automatic training, which occurs in the background while code development is undertaken by the developer on their own schedule, thus reducing distractions and effort. Launching an automatic training process minimizes the down time traditionally needed to manually launch the training during the development process and integrate the result into the build.

For example, model manager 118 may determine to train the ML model remotely, such that model manager 118 may provide an indication to request processor 108. The indication may include a representation of the ML model (e.g., in an instance where the ML model was initialized by model manager 118) or may include an indication of a pre-existing model (e.g., as may be stored by model repository 112 or as may be indicated by a uniform resource locator (URL), among other examples). Model manager 118 may provide at least a part of the training data with which the ML model will be trained (e.g., from training data store 120) or, as another example, model manager 118 may provide an indication as to a location from which the training data may be obtained. Thus, it will be appreciated that training data may be provided by or obtained from any of a variety of sources. For example, ML service 102 may provide training data with which to train an ML model.

Model manager 118 may generate a model wrapper based on the ML model declaration, such that the model wrapper may be used when parsing, authoring, building, or generating a software executable within development environment 116, even in instances where the ML model has not yet been fully trained (e.g., to completion or convergence). Thus, as a result of generating the model wrapper, the software development process may continue. The model wrapper may have an associated defined type, thereby enabling various functionality of development application 114 to be applied to the ML model (e.g., development-time type verification, code suggestions, and/or code autocompletion and generation). The model wrapper also provides compile-time type verification, among other examples. Models hosted in foreign frameworks may also be wrapped by the model wrapper (e.g., may require bridge code and inter-process communication).

In some instances, the model wrapper may use a placeholder model or an intermediate model that may be periodically updated (e.g., after a predetermined amount of time and/or number of epochs has elapsed). For example, an object representation of the model may be used (e.g., in an ONNX or other format). As a result, performance of the intermediate ML model used during the software development process may gradually improve or may change over time. In examples, model manager 118 obtains attributes from ML service 102 associated with training the ML model, which may be presented to a user of computing device 104 (e.g., via development application 114). Similarly, model manager 118 may stop, restart, or otherwise update the model training process, as may be the case when a change to the software code and/or training data results in a corresponding change to the ML model.

Thus, model manager 118 may automatically obtain and integrate a trained ML model (e.g., a placeholder model, an intermediate model, or a fully trained model) into a compiled software binary or when parsing software code. For example, such aspects may be performed during either the compile phase, linking phase, or other build phases in the context of software code interpretation, compilation, and deployment. For example, linkage may include an inline block of intermediate code (IC), application manifest resources linked at link time, and/or external sources (e.g., as may be user-configurable, automatically determined, or determined according to a set of defaults).

Thus, aspects of the present disclosure may simplify and streamline aspects associated with incorporating an ML model into software code, thereby yielding a completed or compiled software application that includes an automatically trained, saved, and linked ML model. Additionally, as noted above, the ML model may be used similar to any other data type within the software code and executes with reduced or eliminated user concern for interoperability, model formats, ML service and/or associated API idiosyncrasies, and/or ML model hosting.

It will be appreciated that while model manager 118 is illustrated as separate from development application 114 and development environment 116, aspects of model manager 118 may be incorporated into development application 114 and/or development environment 116 in other examples. For example, aspects of model manager 118 may be incorporated by a pre-processor, interpreter, compiler, debugger, and/or linker of development environment 116.

As another example, development application 114 may incorporate similar aspects and may include a user interface pane that shows one or more identified ML models and associated attributes (e.g., an indication of current training status, a number of training epochs, one or more hyperparameters, and/or a readiness for linkage into the software application). In such an example, each model identified within a code block may automatically be populated in the user interface pane, for instance with a status to indicate that it is untrained. In examples where an ML model is from a remote repository (e.g., model repository 112), the model may automatically be downloaded and the associated status may be updated to show version information of the downloaded model. As another example, development application 114 may include user interface aspects for interfacing with ML service 102, Azure ML (or other cloud-based ML) training services and defining how the models and cost of model training will occur may be offered to the user as global settings for the project. Additional examples of such aspects are described below with respect to FIG. 5.

As illustrated, ML service 102 includes request processor 108, training engine 110, and model repository 112. In examples, request processor 108 handles requests from computing devices such as computing device 104. For example, request processor 108 may process a request associated with training an ML model (e.g., as may be trained by training engine 110) and/or a request to obtain an existing ML model (e.g., as may be stored by model repository 112). Training engine 110 may train an ML model (e.g., as may be received as part of the request or obtained from model repository 112) according to an indication received from model manager 118. In examples, ML service 102 may include a training data store (not pictured) from which training data may be obtained and used to train an ML model accordingly.

While system 100 is illustrated as including one ML service 102 and one computing device 104, it will be appreciated that any number of such elements may be used in other examples. Additionally, while functionality is described above with respect to ML service 102 and computing device 104, it will be appreciated that such functionality may be implemented according to any of a variety of other paradigms in other examples. For example, computing device 104 may include a training engine, such that an identified ML model is trained local to computing device 104. As another example, ML service 102 may be part of a cloud-based software authoring platform, such that at least a part of the functionality discussed above with respect to model manager 118 may be provided by the cloud-based software authoring platform. As a further example, an existing ML model may be obtained from any of a variety of other sources, including another ML service, a different model repository, or a remote computing device, among other examples.

Figure 2:
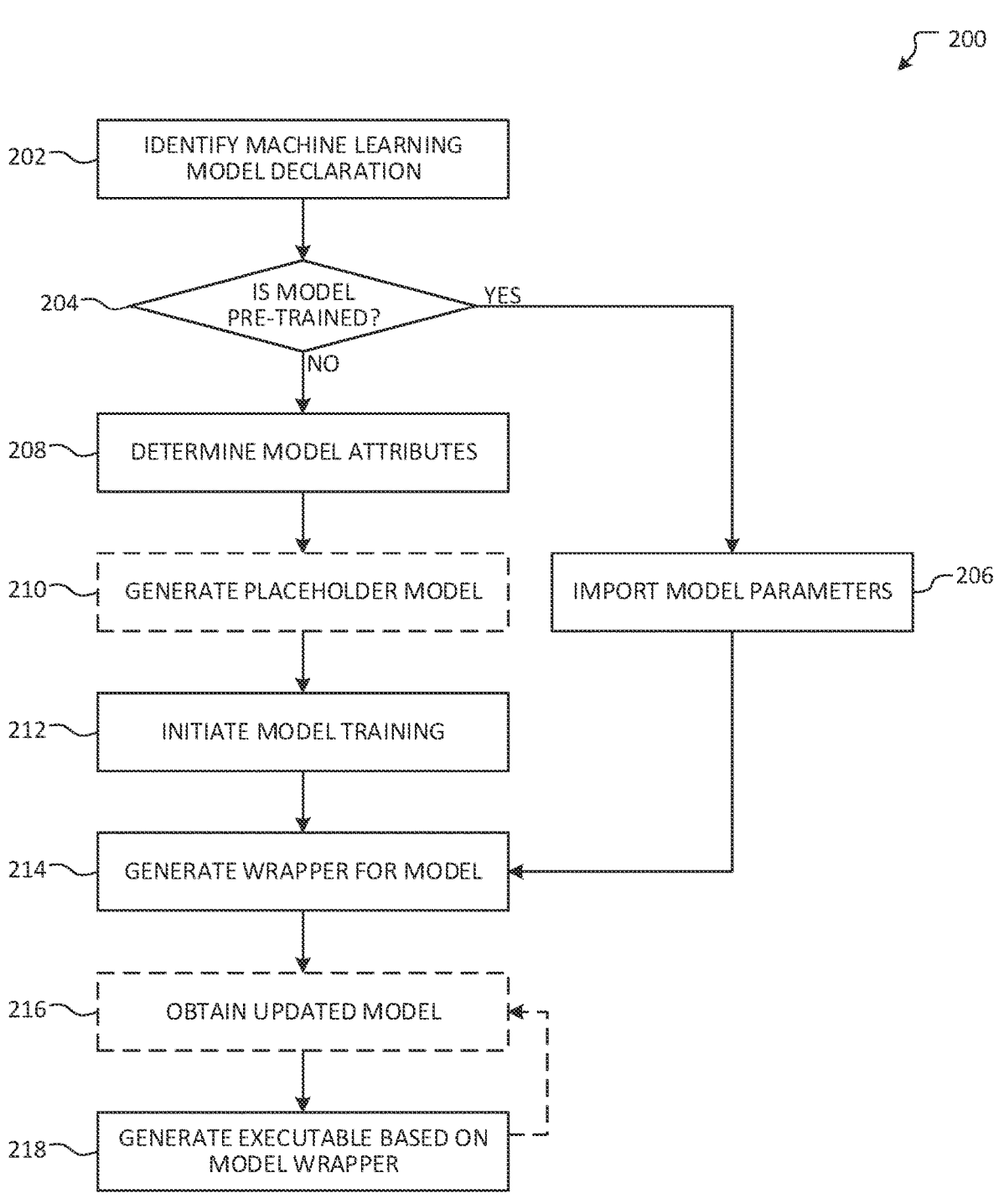
FIG. 2 illustrates an overview of an example method for processing software code to manage an associated machine learning model according to aspects described herein.

FIG. 2 illustrates an overview of an example method 200 for processing software code to manage an associated machine learning model according to aspects described herein. In examples, aspects of method 200 may be performed by a model manager, such as model manager 118 discussed above with respect to FIG. 1. As another example, aspects of method 200 may be performed by a development application, such as development application 114.

Method 200 begins at operation 202, where an ML model declaration is identified. In examples, the ML model declaration is identified as a result of the ML model declaration conforming to a predefined format, contextual inference, or based on pattern matching techniques, among other examples. As another example, operation 202 may comprise receiving a user indication of an ML model declaration within software code, for example confirming that an ML model declaration was detected correctly or to identify a subpart of the software code that includes the ML model declaration. Thus, it will be appreciated that any of a variety of identification techniques may be used to identify the ML model declaration, including use of language-based machine learning techniques.

At determination 204, it is determined whether the ML model associated with the identified ML model declaration is a pre-trained model. As noted above, an ML declaration may indicate a pre-existing model that has already been trained, such that the ML model may be used by the software code without additional training. For example, the ML declaration may indicate a model of a model repository (e.g., model repository 112 in FIG. 1) or may reference an existing model in an object format (e.g., from another project), among other examples.

Accordingly, if it is determined that the model is pre-trained, flow branches "YES" to operation 206, where model parameters are imported. For example, the model parameters may be imported from the ML model in object format, from an associated resource manifest, or from associated software code, among other examples. For example, the parameters may indicate an associated type and/or structure for input and/or output for information to and from the ML model. Flow progresses to operation 214, which is discussed below.

Returning to determination 204, if it is instead determined that the model is not pre-trained, flow branches "NO" to operation 208, where model attributes are determined. For example, the model attributes may be determined from content of the software code, based on one or more user preferences, and/or based on one or more defaults, among other examples. Example attributes include, but are not limited to, one or more model parameters, an indication as to a training data source, an input and/or output layer feature selection and vectorization, a type inference, a set of hyperparameters, an activation function, and/or other architectural features for the ML model. In examples, at least some of the attributes determined at operation 208 may be received as user input (e.g., in response to a prompt for one or more model attributes or confirmation that attributes were correctly identified from software code).

At operation 210, a placeholder model is generated. The placeholder model may be generated based on the model attributes that were determined at operation 208. In examples, the ML model declaration that was identified at operation 202 may include an indication as to an ML model type with which the placeholder model may be generated. As another example, operation 210 may comprise generating the placeholder model based on a model suggestion (e.g., as may be obtained from a machine learning service, such as machine learning service 102 in FIG. 1). Operation 210 is illustrated using a dashed box to indicate that, in some examples, operation 210 may be omitted, as may be the case when the ML model declaration indicates an existing ML model that will be finetuned or otherwise trained with training data.

Flow progresses to operation 212, where training of the ML model is initiated. In examples, the ML model is trained based on training data indicated by the ML model declaration (e.g., as may be stored by a training data store, such as training data store 120 in FIG. 1). In other examples, the ML model may be trained using a set of generic or standard training data (e.g., as may be stored or otherwise provided by a machine learning service, such as machine learning service 102). In some instances, operation 212 comprises training the model locally or, as another example, operation 212 may comprise providing an indication to a model training service to train the ML model. The indication may include an indication of training data with which to train the ML model, as well as a representation of the ML model or an indication of a pre-existing ML model (e.g., from a model repository). The ML model may be trained using any of a CPU, TPU, and/or a GPU (e.g., as may be specified by associated software code, a user preference, or a default) or similar hardware. Additional examples of such aspects are discussed below with respect to method 300 of FIG. 3.

At operation 214, a wrapper is generated for the model, such that the model wrapper may be used when parsing the software code or generating a software executable (e.g., even in instances where the ML model has not yet been trained to completion or convergence). In examples, the model wrapper has an associated type (e.g., as may have been determined based on the determined model attributes or the imported model parameters), thereby enabling type verification, code suggestions and/or autocompletion, and/or to provide compile-time type verification, among other examples. In examples where operation 214 is performed after operation 206, the model wrapper may use the pre-trained model for which the model parameters were imported. Similarly, if operation 214 is performed after operation 212, the model wrapper may use the placeholder model that was generated at operation 210 or may use an intermediate model that has not yet been fully trained (e.g., as may be the case when a pre-existing model has not yet been finetuned).

At operation 216, an updated model (e.g., an intermediate model) may be obtained. For example, an intermediate model may be obtained during the model training process, such that the intermediate model is used by the model wrapper. Operation 216 is illustrated using a dashed box to indicate that, in some examples, operation 216 may be omitted. For example, if the model is pre-trained, an intermediate model need not be obtained. As another example, the user may indicate a preference to use a placeholder model until model training has completed. In examples, the intermediate model is obtained in an object format that may be incorporated into a software executable or used when parsing the software code, among other examples.

Flow progresses to operation 218, where a software executable is generated based on the model wrapper. For example, an object for the model (e.g., for a pre-trained model, for a placeholder model, or for an intermediate model) may be referenced by, linked to, or otherwise incorporated into the software executable when compiling the associated software code. It will be appreciated that while method 200 is described in an example where an executable is generated from software code, similar techniques may be used for software code that is parsed. Additional examples of such aspects are discussed below with respect to FIG. 4. Method 200 terminates at operation 218.

Figure 3:
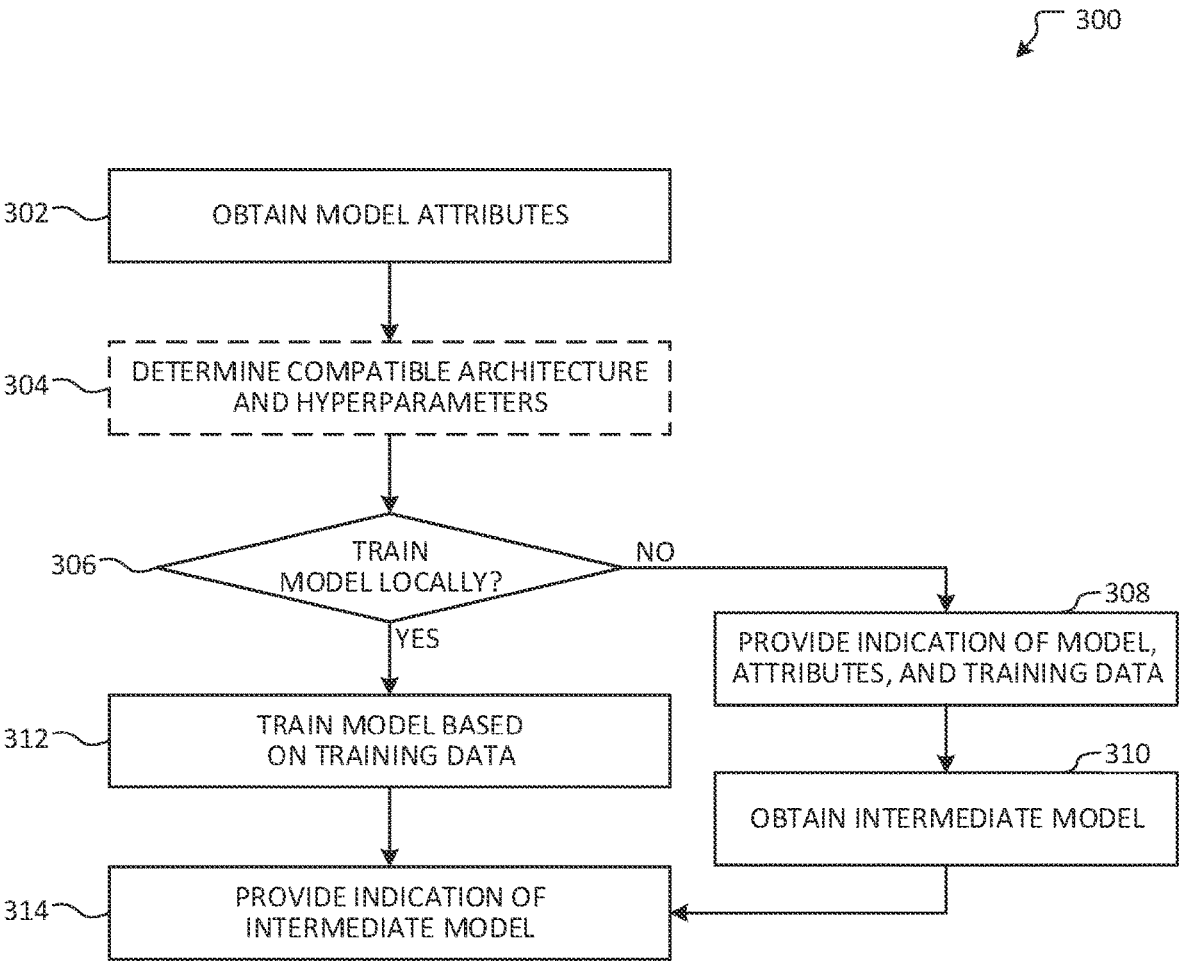
FIG. 3 illustrates an overview of an example method for training an identified machine learning model according to aspects described herein.

FIG. 3 illustrates an overview of an example method 300 for training an identified machine learning model according to aspects described herein. In examples, aspects of method 300 are performed by a model manager and/or a training engine, such as model manager 118 and training engine 110 discussed above with respect to FIG. 1. For example, aspects of method 300 may be performed as a result of or as part of operation 212 discussed above with respect to method 200 of FIG. 2.

Method 300 begins at operation 302, where model attributes are obtained. In examples, the model attributes are received as part of a request to train the ML model (e.g., as may be received as a result of performing aspects of operation 212 in method 200 of FIG. 2). In some examples, at least a part of the model attributes may be determined from a set of user preferences and/or a set of defaults, among other examples. Thus, it will be appreciated that model attributes may be obtained from any of a variety of sources.

At operation 304, a compatible ML model architecture may be determined, for example according to the model attributes that were determined at operation 302. Similarly, a set of hyperparameters may be determined. Operation 304 is illustrated using a dashed box to indicate that, in some examples, operation 304 may be omitted, as may be the case when the software code or an associated request to train the ML model includes an indication of an architecture and/or one or more hyperparameters.

Flow progresses to determination 306, where it is determined whether to locally train the ML model (on the device). In examples, the determination comprises evaluating a user preference, a default preference, software code, and/or a request to train the ML model, among other examples. In some instances, a user-configurable default training hierarchy may be evaluated, for example indicating a hierarchy of local training and/or one or more cloud-based training services. As an example, local training may be used when training has lower associated computational resource utilization, while remote training may be used in instances when training the ML model has comparatively higher computational resource utilization.

If it is determined that the model is not to be trained locally, flow branches "NO" to operation 308, where an indication of the ML model, obtained model attributes, and associated training data is provided to a machine learning service, such as machine learning service 102 discussed above with respect to FIG. 1. In examples, the indication includes the ML model and/or training data itself, or may include an indication of a location from which to access the ML model and/or training data. In some instances, an indication may be provided as to whether CPU- and/or GPU-based training should be used.

Flow progresses to operation 310, where an intermediate model is obtained from the machine learning service, which may be obtained in an object format. An indication of the obtained intermediate model is provided at operation 314, such that it may be used as described above (e.g., for generating a software executable or parsing software code). Method 300 terminates at operation 314.

Returning to determination 306, if it is instead determined to train the model locally, flow branches "YES" to operation 312, where the ML model is trained locally based on the training data. In examples, the ML model may be trained using one or more CPUs, tensor processing units (TPUs), and/or GPUs, as may have been indicated by a model attribute obtained at operation 302. In some instances, operation 312 comprises accessing training data from a location indicated by software code associated with a detected ML model declaration. It will be appreciated any of a variety of techniques may be used to train a machine learning model according to aspects described herein.

Flow progresses to operation 314, where, as described above, an indication of an intermediate model is provided. The intermediate model may comprise an object representation of the ML model that has not yet converged, such the intermediate model may be used to generate a software executable or parse software code and enable continued software development even while the ML model is trained at operation 312. Method 300 terminates at operation 314.

Figure 4:
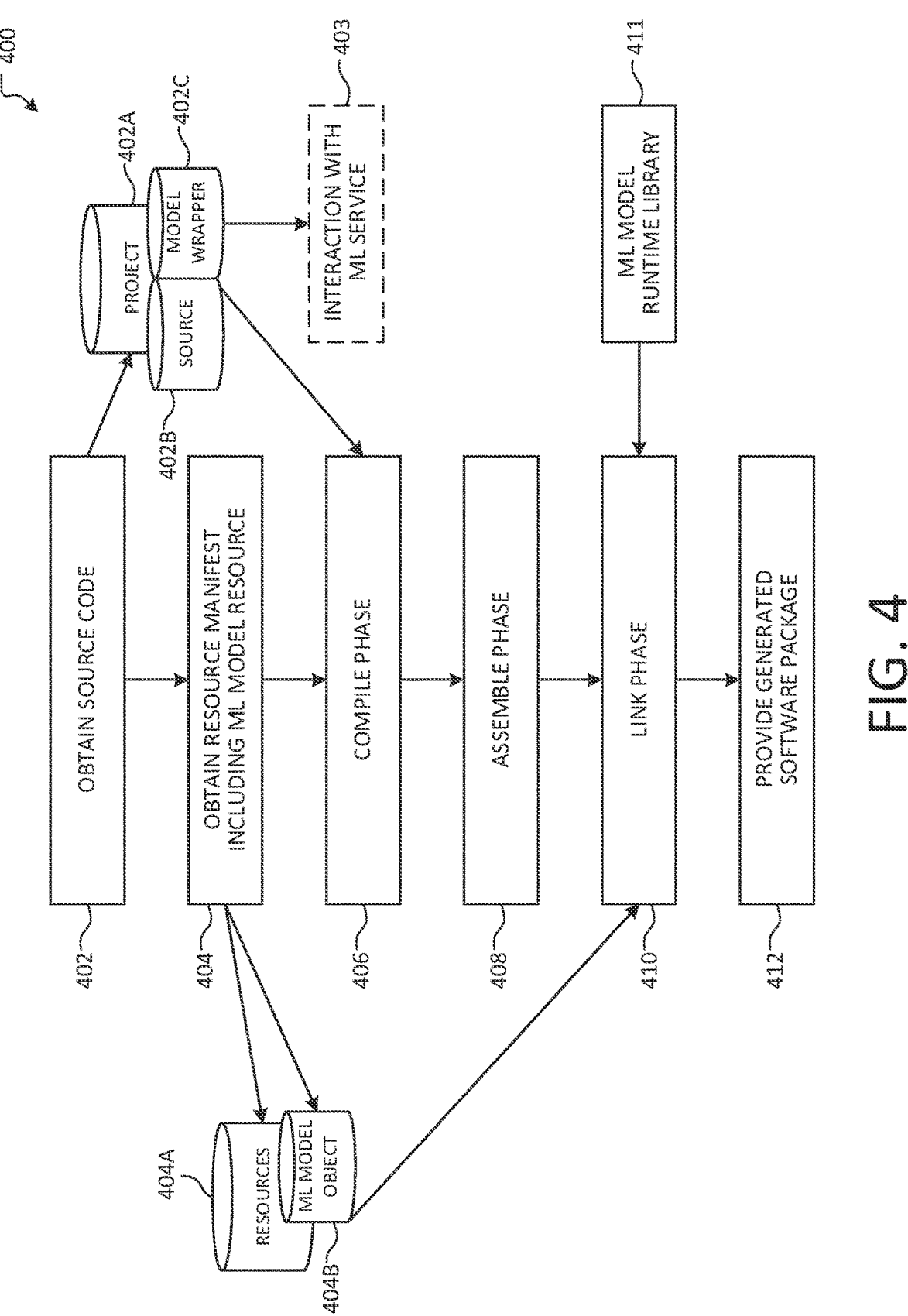
FIG. 4 illustrates an overview of an example method for generating a software package according to aspects described herein.

FIG. 4 illustrates an overview of an example method 400 for generating a software package according to aspects described herein. In examples, aspects of method 400 may be performed by a development application, development environment, and/or model manager, such as development application 114, development environment 116, and/or model manager 118 discussed above with respect to FIG. 1. In examples, aspects of method 400 comprise a subsequent build process, while aspects of method 200 in FIG. 2 may be performed as part of an initial build process.

Method 400 begins at operation 402, where source code is obtained. For example, project 402A may include source 402B and model wrapper 402C (e.g., as may have been generated as a result of operation 214 discussed above with respect to method 200 of FIG. 2). While examples herein are discussed with respect to a single model wrapper (e.g., model wrapper 402C), it will be appreciated that any number of model wrappers may be used, as may be the case when source 402B includes multiple ML model declarations. As illustrated by dashed box 403, model wrapper 402C may, in some examples, facilitate interaction with a machine learning service (e.g., machine learning service 102), as may be the case when the ML model Flow progresses to operation 404, where a resource manifest is obtained that includes an ML model resource. For example, the resources 404A includes ML model object 404B, which may have been obtained as a result of performing aspects of operation 216 or operation 314 discussed above with respect to FIGS. 2 and 3, respectively. In examples where source 402B has changed in a way that affects ML model object 404B, changes to the training process and/or a training corpus may be fine-tuned so as to reduce an associated training cost as compared to restarting training altogether. As an example, ML model object 404B may be a placeholder model, an intermediate model, or a trained model (e.g., may have been a pre-existing model or as may have been trained to convergence and/or to satisfy a set of constraints).

At operation 406, the obtained source code is compiled (e.g., based on source 402B and model wrapper 402C). For example, wrapper 402C may enable operation 406 to include compile-time type verification, among other examples. Assembly code generated at operation 406 may subsequently be assembled into machine code at operation 408.

Accordingly, at operation 410, machine code from operation 408 is linked with ML model object 404B and, as illustrated, ML model runtime library 411. Linkage may include one or more inline blocks in intermediate code, manifest resources that are linked at link time, and/or links to external sources (e.g., as may depend on a user preference and/or an indication in source 402B). As noted above, ML model runtime library 411 may be included as a result of identifying an associated ML model declaration within source 402B. While a single library 411 is illustrated in the present example, it will be appreciated that any number of libraries may be included, as may be the case when multiple ML model declarations having different associated runtime libraries are identified with source 402B.

Flow progresses to operation 412, where a generated software package is provided. For example, the generated software package may include a set of executables and one or more associated resources (e.g., including an ML object, such as ML object 404B), which may be provided for execution by a computing device (e.g., computing device

104 in FIG. 1). In examples, the software package may be bundled (e.g., as a compressed archive or as an installer) for distribution to a set of end users. It will thus be appreciated that the resulting software package may thus be provided in any of a variety of formats. Method 400 terminates at operation 412.

FIG. 5 illustrates an overview of an example graphical user interface 500 for a development application according to aspects described herein. In examples, user interface 500 may be displayed by a development application, such as development application 114 discussed above with respect to FIG. 1.

As illustrated, user interface 500 includes source pane 504 and ML model view pane 508. Software code of a source file associated with tab 502 (e.g., "SOURCE FILE 1") is displayed in source pane 504, which includes ML model declaration 506. Accordingly, ML model declaration 506 may be automatically detected according to aspects described herein, such that ML model view pane 508 is updated accordingly. As illustrated, ML model view pane 508 comprises model entry 510 that includes information associated with ML model declaration 506. For instance, model entry 510 indicates that the ML model is a local model (e.g., as compared to a pre-existing model from a model repository) and that the ML model will be trained using GPU-based training by a machine learning service. Model entry 510 further indicates that the ML model has not yet been trained and that a corpus of "TRAINING-DATA.CSV" will be used for training. While example information and user experience aspects are described with respect to user interface 500, it will be appreciated that any of a variety of additional or alternative information may be presented according to any of a variety of other techniques. For example, model entry 510 may include one or more user interface controls with which a user may control training of the ML model (e.g., transition between local and remote training and/or to start, stop, pause, and/or resume training).

Figure 6:
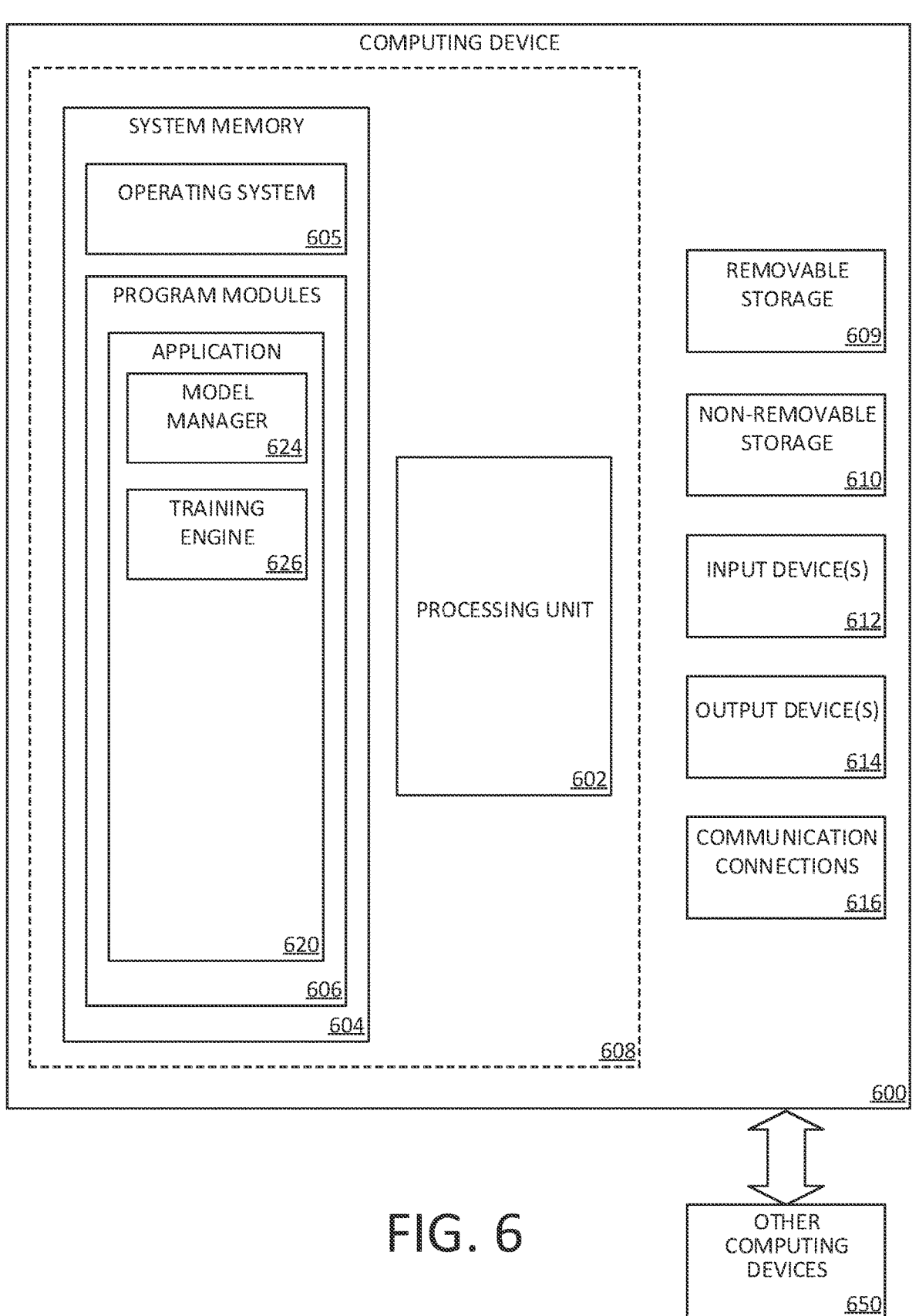
FIG. 6 is a block diagram illustrating example physical components of a computing device with which aspects of the disclosure may be practiced.
Figure 7A:
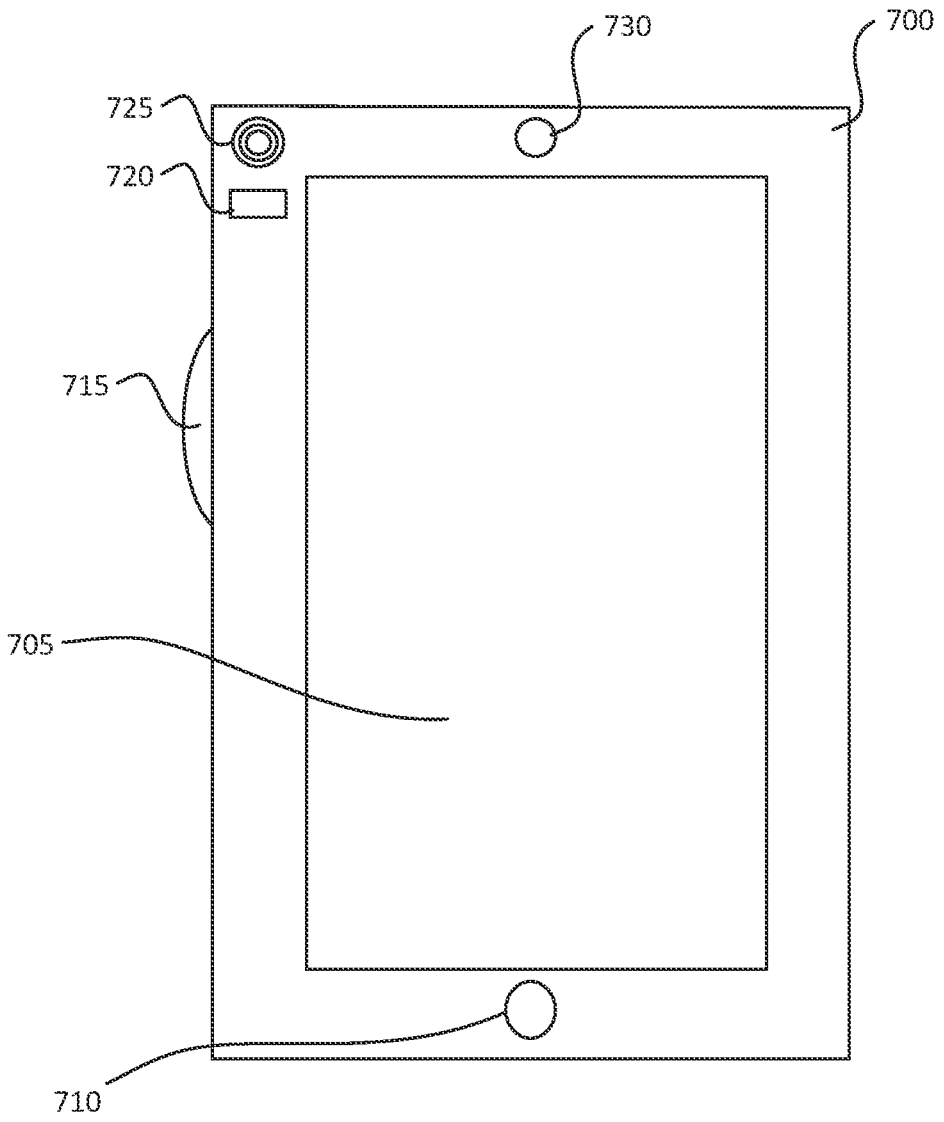
FIGS. 7A and 7B are simplified block diagrams of a mobile computing device with which aspects of the present disclosure may be practiced.
Figure 7B:
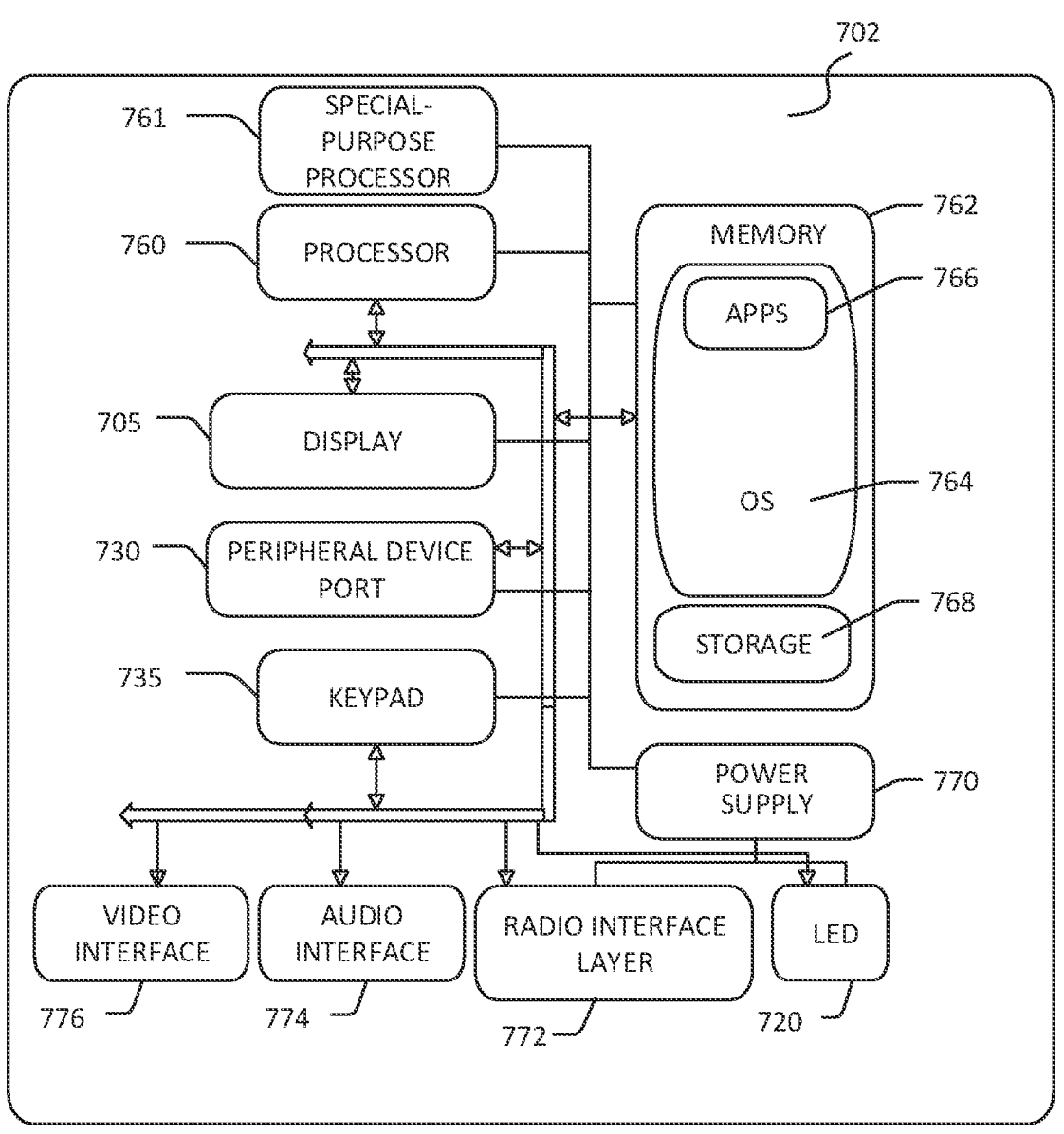
Figure 8:
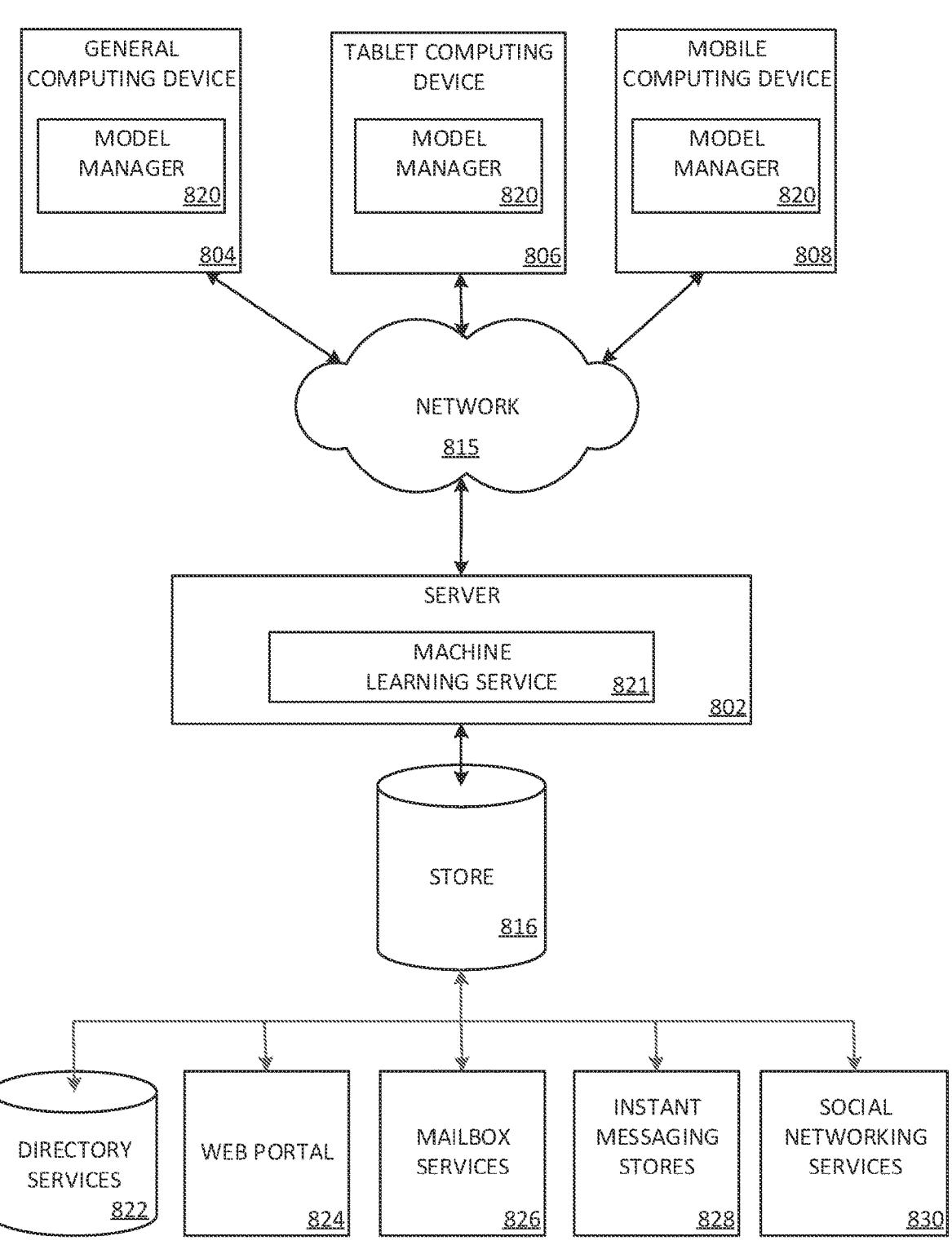
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including one or more devices associated with machine learning service 102, as well as computing device 104 discussed above with respect to FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store model manager 624 and training engine 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In another example, mobile computing device 700 may also include an optional keypad (not pictured), which may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A model manager 820 may be employed by a client that communicates with server device 802, and/or machine learning service 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a system comprising: at least one processor; and memory storing instructions that, when executed by the at least one processor, cause the system to perform a set of operations. The set of operations comprises: identifying a declaration of a machine learning (ML) model within software code of a software project; initiating training of the ML model using a set of attributes associated with the ML model; generating a model wrapper for the ML model; building the software project based on the model wrapper for the ML model; and outputting the built software project for execution. In an example, the set of operations further comprises obtaining an intermediate model for the ML model and the model wrapper incorporates the intermediate model for execution of the software project. In another example, the set of attributes includes an indication of local training; and initiating training of the ML model comprises training the ML model based on training data indicated by the software code. In a further example, the set of attributes includes an indication of remote training; and initiating training of the ML model comprises providing, to a machine learning service, an indication of the ML model and training data for training the ML model. In yet another example, building the software project includes generating, based on the model wrapper, an application programming interface call to a machine learning service associated with the ML model. In a further still example, the set of operations further comprises updating a user interface of a development application displaying at least a part of the software code to include a model entry for the ML model, wherein the model entry includes an indication of at least one of the set of attributes associated with the ML model. In another example, the set of attributes is determined based on one or more of the software code, a user-configured preference, or a default preference. In a further example, identifying the declaration of the ML model includes at least one identification technique selected from the group consisting of pattern matching, semantic matching, contextual inference, receiving a user indication of the declaration of the ML model, and identifying a declaration that conforms to a predefined format.

In another aspect, the technology relates to a method for comprising: identifying a declaration of a machine learning (ML) model within software code of a software project; providing, to a machine learning service, an indication of the ML model and training data for training the ML model; obtaining, from the machine learning service, an intermediate model for the ML model; building the software project based on the intermediate model; and outputting the built software project for deployment or execution. In an example, the method further comprises generating a model wrapper that incorporates the intermediate model from the machine learning service. In another example, outputting the built software includes invoking a debugger interface to perform executable debugging of the built software project. In a further example, the method further comprises: obtaining, from the machine learning service, and indication of a training status for the ML model; and updating a user interface of a development application displaying at least a part of the software code to include a model entry for the ML model, wherein the model entry includes an indication of the training status for the ML model. In yet another example, the method further comprises: obtaining, from the machine learning service, a second model comprising a second intermediate model or a fully-trained model for the ML model; and building the software project based on the second model. In a further still example, building the software project comprises generating a software executable that includes, as a result of identifying the declaration of the ML model, a runtime library associated with the ML model.

In a further aspect, the technology relates to a method comprising: identifying a declaration of a machine learning (ML) model within software code of a software project; initiating automatic training of the ML model using a set of attributes associated with the ML model; generating a model wrapper for the ML model; and executing the software project based on the model wrapper for the ML model. In an example, the method further comprises obtaining an intermediate model for the ML model and the model wrapper incorporates the intermediate model for execution of the software project. In another example, the set of attributes includes an indication of remote training; and initiating training of the ML model comprises providing, to a machine learning service, an indication of the ML model and training data for training the ML model. In a further example, executing the software project includes generating, based on the model wrapper, an application programming interface call to a machine learning service associated with the ML model. In yet another example, the method further comprises updating a user interface of a development application displaying at least a part of the software code to include a model entry for the ML model, wherein the model entry includes an indication of at least one of the set of attributes associated with the ML model. In a further still example, the set of attributes is determined based on one or more of the software code, a user-configured preference, or a default preference.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:
1. A system comprising:
at least one processor; and memory storing instructions that, when executed by the at least one processor, cause the system to perform a set of operations, the set of operations comprising:

identifying a declaration of a machine learning (ML) model within software code of a software project;

in response to identifying the declaration of the ML model within the software code:

initiating training of the ML model using a set of attributes associated with the ML model, wherein the set of attributes is automatically determined based on at least one of software code content, a set of preferences, or received user input; and generating a model wrapper for the ML model, wherein the model wrapper represents a set of attributes associated at least one of a type of data input or a type of data output for the ML model;

building the software project based on the model wrapper for the ML model;

obtaining an intermediate model for the ML model that is incorporated into the model wrapper for a first execution of the software project, wherein the intermediate model is partially trained as a result of initiating the training of the ML model, wherein the partially trained intermediate model is used while the ML model is still being trained, thereby enabling continued software development; and outputting the built software project for execution.

2. The system of claim 1, wherein the set of operations further comprises:

obtaining a completed model for the ML model that is incorporated into the model wrapper for a second execution or the software project.

3. The system of claim 1, wherein:

the set of attributes includes an indication of local training; and initiating training of the ML model comprises training the ML model based on training data indicated by the software code.

4. The system of claim 1, wherein:

the set of attributes includes an indication of remote training; and initiating training of the ML model comprises providing, to a machine learning service, an indication of the ML model and training data for training the ML model.

5. The system of claim 1, wherein building the software project includes generating, based on the model wrapper, an application programming interface call to a machine learning service associated with the ML model.

6. The system of claim 1, wherein the set of operations further comprises updating a user interface of a development application displaying at least a part of the software code to include a model entry for the ML model, wherein the model entry includes an indication of at least one of the set of attributes associated with the ML model.

7. The system of claim 1, wherein the set of attributes is determined based on one or more of the software code, a user-configured preference, or a default preference.

8. The system of claim 1, wherein identifying the declaration of the ML model includes at least one of pattern matching, semantic matching, contextual inference, receiving a user indication of the declaration of the ML model, or identifying a declaration that conforms to a predefined format.

9. A method, comprising:

identifying a declaration of a machine learning (ML) model within software code of a software project;

in response to identifying the declaration of the ML model within the software code:

providing, to a machine learning service, an indication of the ML model and training data for training the ML model, wherein the software code includes an indication of the training data with which to train the ML model; and obtaining, from the machine learning service, an intermediate model for the ML model, wherein the intermediate model is partially trained as a result of initiating the training of the ML model, wherein the partially trained intermediate model is used while the ML model is still being trained, thereby enabling continued software development;

building the software project based on the intermediate model, wherein the software project comprises a model wrapper associated with the intermediate model that represents a set of attributes associated with at least one of a type of data input or a type of data output for the intermediate model; and outputting the built software project for deployment or execution.

10. The method of claim 9, further comprising generating the model wrapper for the software project in response to identifying the declaration of the ML model within software code that incorporates the intermediate model from the machine learning service.

11. The method of claim 9, wherein outputting the built software includes invoking a debugger interface to perform executable debugging of the built software project.

12. The method of claim 9, further comprising:

obtaining, from the machine learning service, and indication of a training status for the ML model; and updating a user interface of a development application displaying at least a part of the software code to include a model entry for the ML model, wherein the model entry includes an indication of the training status for the ML model.

13. The method of claim 9, further comprising:

obtaining, from the machine learning service, a second model comprising a second intermediate model or a fully-trained model for the ML model; and building the software project based on the second model.

14. The method of claim 9, wherein building the software project comprises generating a software executable that includes, as a result of identifying the declaration of the ML model, a runtime library associated with the ML model.

15. A method, comprising:

identifying a declaration of a machine learning (ML) model within software code of a software project;

in response to identifying the declaration of the ML model within the software code:

initiating automatic training of the ML model using a set of attributes associated with the ML model, wherein the set of attributes is automatically determined based on at least one of software code content, a set of preferences, or received user input; and generating a model wrapper for the ML model, wherein the model wrapper represents a set of attributes associated at least one of a type of data input or a type of data output for the ML model;

obtaining an intermediate model for the ML model that is incorporated into the model wrapper for a first execution of the software project, wherein the intermediate model is partially trained as a result of initiating the training of the ML model, wherein the partially trained intermediate model is used while the ML model is still being trained, thereby enabling continued software development; and executing the software project based on the model wrapper for the ML model.

16. The method of claim 15, further comprising:

obtaining a completed model for the ML model that is incorporated into the model wrapper for a second execution of the software project.

17. The method of claim 15, wherein:

the set of attributes includes an indication of remote training; and initiating training of the ML model comprises providing, to a machine learning service, an indication of the ML model and training data for training the ML model.

18. The method of claim 15, wherein executing the software project includes generating, based on the model wrapper, an application programming interface call to a machine learning service associated with the ML model.

19. The method of claim 15, further comprising updating a user interface of a development application displaying at least a part of the software code to include a model entry for the ML model, wherein the model entry includes an indication of at least one of the set of attributes associated with the ML model.

20. The method of claim 15, wherein the set of attributes is determined based on one or more of the software code, a user-configured preference, or a default preference.

*   *   *   *   *